United States Patent [19]
Tretter

[11] Patent Number: 5,867,606
[45] Date of Patent: Feb. 2, 1999

[54] APPARATUS AND METHOD FOR DETERMINING THE APPROPRIATE AMOUNT OF SHARPENING FOR AN IMAGE

[75] Inventor: Daniel R. Tretter, Mountain View, Calif.

[73] Assignee: Hewlett-Packard Company, Palo Alto, Calif.

[21] Appl. No.: 909,680

[22] Filed: Aug. 12, 1997

[51] Int. Cl.[6] .............................. G06T 5/00; H04N 1/409
[52] U.S. Cl. .......................... 382/261; 382/263; 382/264; 382/266; 358/447
[58] Field of Search .................................... 382/261, 260, 382/263, 264, 266, 269, 254, 275; 358/447, 463

[56] References Cited

U.S. PATENT DOCUMENTS

| 4,315,318 | 2/1982 | Kato et al. | 382/264 |
|---|---|---|---|
| 4,317,179 | 2/1982 | Kato et al. | 382/264 |
| 4,591,923 | 5/1986 | Urabe et al. | 358/447 |
| 4,654,926 | 4/1987 | Fukui . | |
| 4,783,840 | 11/1988 | Song | 382/261 |
| 4,945,502 | 7/1990 | Kwon et al. . | |
| 5,001,573 | 3/1991 | Sakamoto et al. | 382/261 |
| 5,038,387 | 8/1991 | Sakamoto | 382/261 |
| 5,038,388 | 8/1991 | Song | 382/266 |
| 5,081,692 | 1/1992 | Kwon et al. | 382/261 |
| 5,204,919 | 4/1993 | Murakami | 382/263 |
| 5,220,624 | 6/1993 | Sakamoto et al. | 382/264 |
| 5,327,257 | 7/1994 | Hrytzak et al. . | |
| 5,351,305 | 9/1994 | Wood et al. | 382/266 |
| 5,392,137 | 2/1995 | Okubo | 382/260 |
| 5,438,654 | 8/1995 | Drebin et al. . | |
| 5,485,534 | 1/1996 | Takemoto et al. | 382/263 |
| 5,497,249 | 3/1996 | Koizumi et al. | 382/263 |
| 5,524,162 | 6/1996 | Levien | 382/263 |
| 5,602,294 | 2/1997 | Takemoto et al. | 382/263 |

OTHER PUBLICATIONS

Lin et al., "Regularized Extrapolation of Noisy Data With Wavelet Signal", 1995, pp. 1244–1247, IEEE.

Chen et al., "A Fast Filtering Algorithm for Image Ehancement", 1994, pp. 557–564, vol. 13(3), IEEE Trans. on Med. Imaging.

Chang et al., "Resolution Enhancement of Images Using Wavelet Transform Extrema Extrapolation", 1995, pp. 2379–2382, IEEE.

Primary Examiner—Scott Rogers
Attorney, Agent, or Firm—Thomas X. Li

[57] ABSTRACT

An image enhancing apparatus is described that includes a filter. The filter enhances the sharpness of an original image in accordance with a sharpening parameter. A sharpening parameter selection system is coupled to the filter. The sharpening parameter selection system determines the sharpening parameter for the filter such that the frequency distribution of a sharpened image of the original image by the filter is similar to that of a low resolution image of the original image. In addition, a method of sharpening an original image is also described.

16 Claims, 11 Drawing Sheets

APPARATUS AND METHOD FOR DETERMINING THE APPROPRIATE AMOUNT OF SHARPENING FOR AN IMAGE

BACKGROUND OF THE INVENTION

1. Field of the Invention

The present invention pertains to image enhancement. More particularly, this invention relates to an apparatus and a method for determining the appropriate amount of sharpening for an image.

2. Description of the Related Art

As is known, image sharpening improves the appearance of a digital image. Using this technique, an image can be made to appear sharper by increasing the high frequency components of the image to emphasize edges and textures of the image. There are generally two different approaches for image sharpening, which are typically referred to as global sharpening and adaptive sharpening. The global sharpening approach typically applies the same amount of sharpening over the entire image, usually using a linear or nonlinear filter. The adaptive sharpening approach typically applies different amounts of sharpening to different image regions of the image. The amount of sharpening for an image region is based on the image properties in that region.

There have been a number of known adaptive sharpening methods. Some choose the sharpening filter from a set of directional sharpening filters on a pixel by pixel or region by region basis in accordance with local image data characteristics. Others adjust the sharpening filter adaptively based on the output of an edge detector that looks at local spatial features in the image. Still others propose to apply the singular value decomposition to blocks of image data and modify the singular values to improve the image sharpness. The adaptive sharpening approach is typically more complex than the global sharpening approach. This is due to the fact that the adaptive sharpening adaptively adjusts the amount of sharpening across an image.

A typical implementation of the global sharpening approach first produces a blurred version of the original image to be sharpened. The blurred image is then subtracted from the original unsharpened image to isolate the high frequency components of the original image. These high frequency components of the original image are then weighted and added back to the original image to produce a sharpened image S. The sharpened image S can therefore be written as a function of the original image I and a blurred image B according to the following equation $$S=I+\lambda(I-B)$$

wherein $\lambda$ is a scalar parameter.

The above sharpening operation is typically implemented by a linear filter, such as an unsharp masking filter. The scalar parameter $\lambda$ is used in the filter to weight the high frequency components. As can be seen from the equation, the greater value the scalar parameter $\lambda$ has, the sharper the sharpened image becomes.

The determination of the scalar parameter $\lambda$ is key to the global image sharpening. If the scalar parameter $\lambda$ is excessively high, the image may be over-sharpened. When this occurs, the sharpened image becomes a noisy image having many sharp edges. If the scalar parameter $\lambda$ is undesirably low, the image may be under-sharpened. When this occurs, the sharpened image is still a blurred image that requires further sharpening.

Prior proposals have been made to determine the appropriate value of the scalar parameter $\lambda$ in order to determine the appropriate amount of sharpening based either on aspects of the original image or the desired use of the image. One such proposal selects the parameter value based on the local contrast values of the image pixels such that the maximum local contrast value of the sharpened image meets a predetermined target and all other local contrast values to an amount proportional thereto.

Disadvantages are, however, associated with such prior art technique. One disadvantage is that it requires non linear calculation at every pixel location. This typically involves a large amount of non standard computation which requires dedicated hardware. Another disadvantage is that it is sensitive to noise. This is because the technique increases the maximum local contrast to a predetermined target value.

SUMMARY OF THE INVENTION

One feature of the present invention is to allow an image to be appropriately enhanced.

Another feature of the present invention is to determine the appropriate amount of sharpening for an image such that the image can be appropriately sharpened.

A still another feature of the present invention is to use an explicit model of the frequency distribution of an original image to control the amount of sharpening of the original image.

A further feature of the present invention is to sharpen an original image such that the frequency distribution the original image after sharpening is similar to that of a low resolution version of the original image.

An image enhancing apparatus is described that includes a filter. The filter enhances the sharpness of an original image in accordance with a sharpening parameter. A sharpening parameter selection system is coupled to the filter. The sharpening parameter selection system determines the sharpening parameter for the filter such that the frequency distribution of a sharpened image of the original image by the filter is similar to that of a low resolution image of the original image.

A method of sharpening an original image is also described. The method first selects a sharpening parameter such that the frequency distribution of a sharpened image of the original image using the selected sharpening parameter is similar to the frequency distribution of a low resolution image of the original image. Then the selected sharpening parameter is applied to a filter to sharpen the original image.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
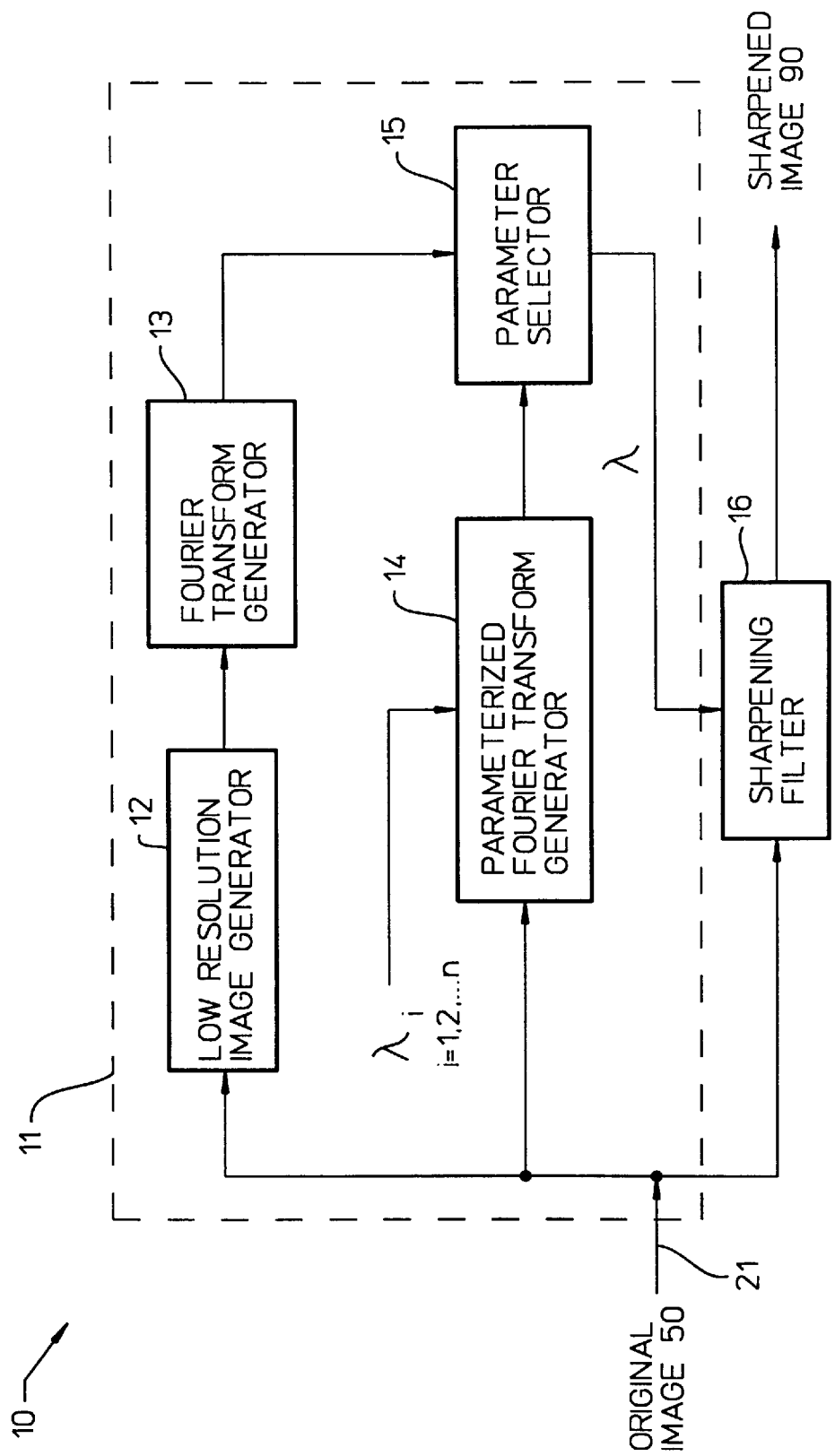
FIG. 1 shows the block diagram of an image sharpening system that includes a sharpening filter, a low resolution image generator, a Fourier transform generator, a parameterized Fourier transform generator, and a parameter selector.
Figure 5:
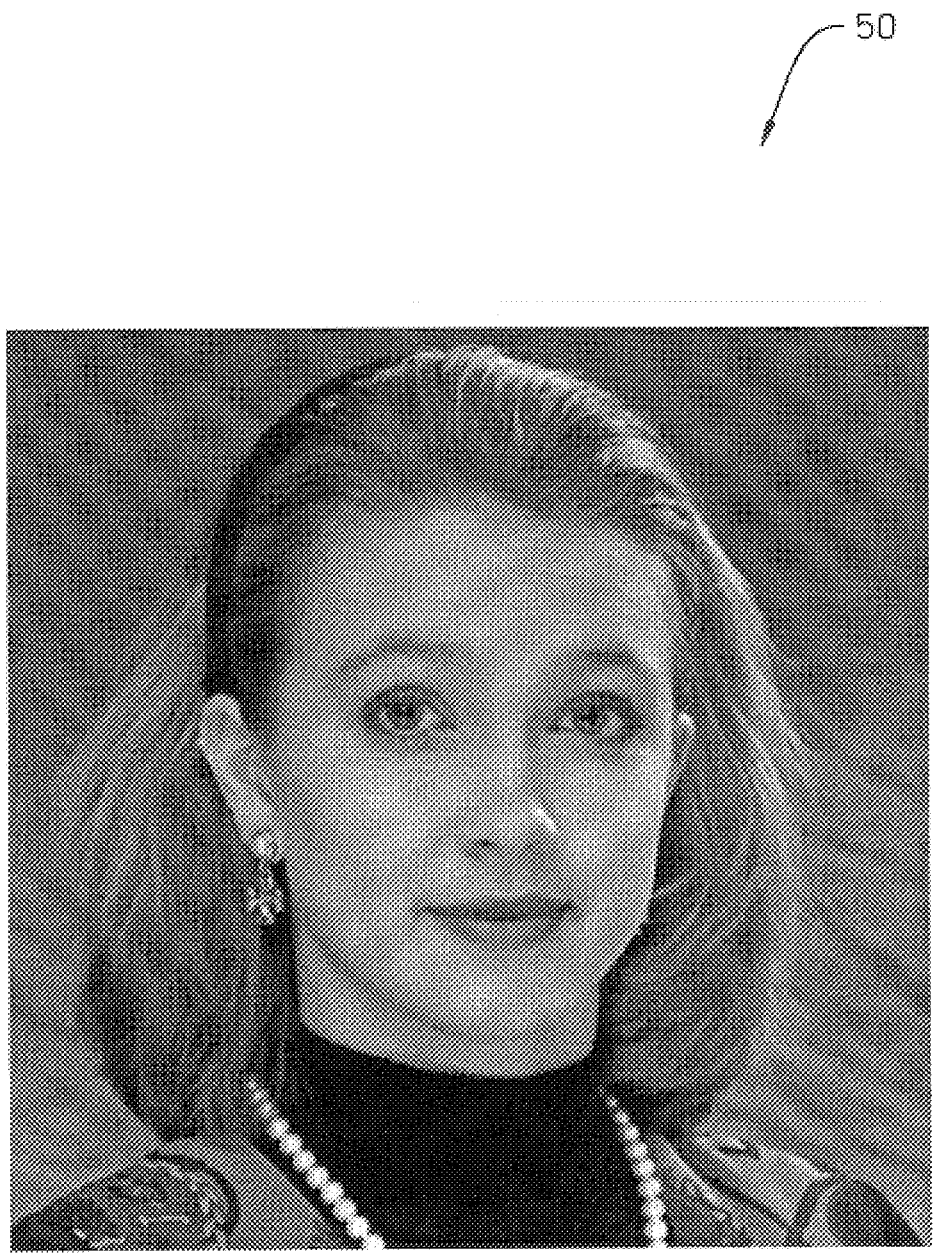
FIG. 5 shows an original image to be sharpened by the image sharpening system of FIG. 1.

FIG. 1 shows the structure of an image sharpening system 10 that sharpens or enhances an original image. In one embodiment, the original image is a digital image. This means that the image is defined in terms of image pixels arranged in a matrix. Alternatively, the original image can be in other forms. The original image is typically pictorial in nature. This means that the original image represents a natural scene. FIG. 5 shows one such original image 50 as an example.

The image sharpening system 10 is designed to sharpen monochrome images. Color images can also be processed by the image sharpening system 10 in an analogous manner in which each color plane is processed separately. Alternatively, multiple units of the image sharpening system 10 can be employed to process the individual color planes of a color image separately and simultaneously. A color image can also be sharpened by transforming the image to a luminance-chrominance representation, sharpening the luminance component as a monochrome image using the image sharpening system 10, and then converting back to the original color plane representation.

In one embodiment, the image sharpening system 10 is used in an image capture and display system. In another embodiment, the image sharpening system 10 is used in a scan-to-print system. Alternatively, the image sharpening system 10 can be used in other imaging systems.

The original image 50 can be obtained from an image capturing device (not shown) or a memory of a computer system (also not shown). Known technologies can be used to obtain the original image 50. For example, the original image 50 can be produced by a scanner or a digital camera, and is directed to be printed by a printer (e.g., a laser or ink jet printer) or to be displayed by a display (e.g., a CRT, LCD, or flat panel display).

In one embodiment, the original image 50 is a 512 pixel×512 pixel image. In another embodiment, the original image 50 is a 1024 pixel×1024 pixel image. Alternatively, the original image 50 can be larger than 1024 pixels×1024 pixels or smaller than 512 pixels×512 pixels.

The image sharpening system 10 produces similar output sharpness for input images with a number of different blurs. Also the image sharpening system 10 sharpens the noisy images less than low noise images because the noise adds high frequency information to the original image. This is a desirable effect because image sharpening also increases the appearance of noise.

As can be seen from FIG. 1, the image sharpening system 10 includes a sharpening parameter selection system 11 and a sharpening filter 16. The sharpening filter 16 sharpens the original image in accordance with a sharpening parameter $\lambda$. The sharpening parameter selection system 11 determines and/or selects the sharpening parameter $\lambda$ to be applied to the sharpening filter 16. The sharpening parameter $\lambda$ controls the sharpening filter 16 to apply the desired or appropriate amount of sharpening to the original image. For positive large values of the sharpening parameter $\lambda$, the sharpening filter 16 magnifies the high frequencies in the image, giving a sharper output image. However, the higher $\lambda$ values may also magnify noise and cause other artifacts to appear in the output image. For small negative values of the sharpening parameter $\lambda$, the sharpening filter 16 smooths the image, thus blurring the image. However, the small $\lambda$ values may help reduce noise in the image. Alternatively, the sharpening parameter $\lambda$ may be replaced with a set of parameters.

Figure 2:
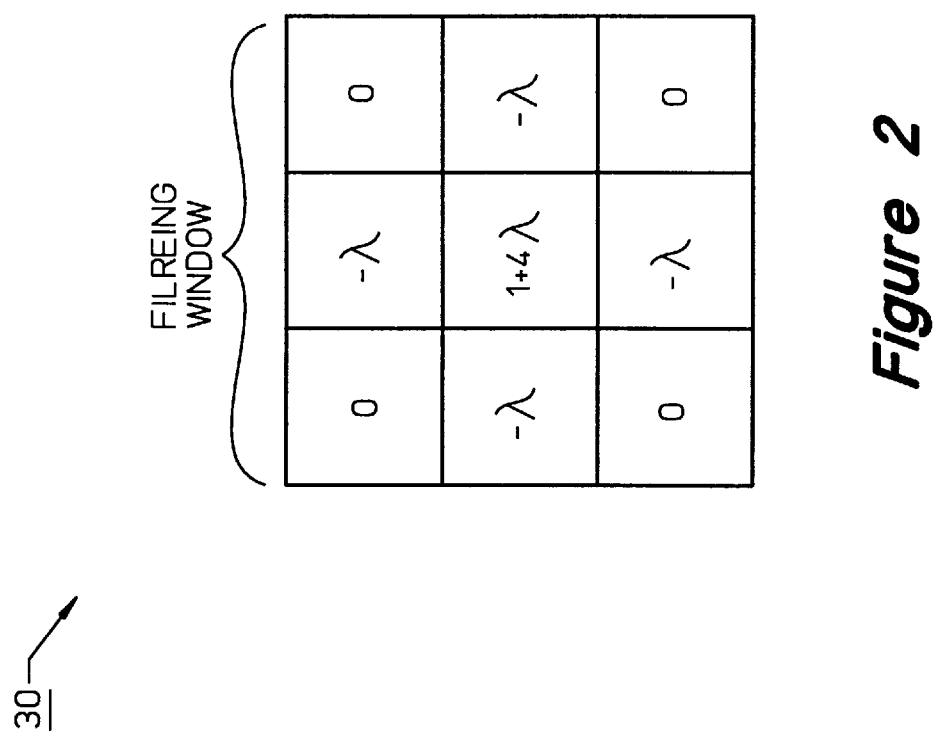
FIG. 2 shows the filter window of the sharpening filter of FIG. 1.

The sharpening filter 16 is a digital filter. In one embodiment, the sharpening filter 16 is a 3×3 unsharp masking filter having a filtering window 30 shown in FIG. 2. Alternatively, the sharpening filter 16 of FIG. 1 can be implemented by other types of filters and can be more complex than the 3×3 unsharp masking filter. In addition, the filtering window of the sharpening filter 16 can be different from the filtering window 30 of FIG. 2. The sharpening filter 16 can be implemented using known hardware, software, or firmware applications.

In accordance with one embodiment of the present invention, the sharpening parameter selection system 11 uses a self-similar assumption to determine the appropriate value of the sharpening parameter $\lambda$ for a given image such that the appropriate amount of sharpening can be applied to the original image. As will be described in more detail below, the sharpening parameter selection system 11 in accordance with one embodiment of the present invention includes a low resolution image generator 12 for generating a low resolution version of the original image to be sharpened. In addition, the sharpening parameter selection system 11 includes a Fourier transform generator 13 that determines the frequency distribution of the low resolution image of the original image. The sharpening parameter selection system 11 also includes a parameterized Fourier transform generator 14 and a parameter selector 15. The parameterized Fourier transform generator 14 generates a number of sharpened images of the original image based on a set of predetermined sharpening parameters $\lambda_i$ (i=1, 2, ... n), and then determines the frequency distribution of each of the sharpened images. The parameter selector 15 compares the frequency distribution of the low resolution image with that of each of the sharpened images to find out which one of the sharpened images has its frequency distribution most similar to that of the low resolution image. That sharpened image is then identified and the predetermined sharpening parameter for that sharpened image is selected by the parameter selector 15 as the sharpening parameter $\lambda$.

The reason that the sharpening parameter selection system 11 can determine or select the appropriate sharpening parameter $\lambda$ for a given image is that under the self-similar assumption, a desirable "sharp" image of a natural scene will be self-similar in scale. This property, often referred to as fractal property, means that the amount of fine detail in a scene is independent of the viewing distance. For example, if a forest is viewed from a distance, the fine detail of the scene may consist of separate and distinguishing tree trunks. As the viewer moves closer towards the forest, the tree trunks become coarser details and the smaller branches and bark texture become fine detail. Still closer, the veins in the leaves become visible as the fine detail. In many natural scenes, the amount of coarse detail versus the amount of fine detail is relatively stable across a wide range of scales. For digital images, this fractal property can be expressed in the frequency domain. If the scene is self-similar in scale, the frequency distribution of a properly sharpened image of the scene will remain roughly the same over a range of resolutions.

In other words, if a low resolution image of a properly sharpened original has certain amount of high frequency components, the properly sharpened original image will have approximately the same amount of the high frequency components. This means that under the self-similar assumption, the low resolution image of an original image can be used to determine the appropriate amount of sharpening of the original image.

Thus, under the self-similar assumption, the sharpening parameter selection system 11 in accordance with one embodiment of the present invention selects the sharpening parameter $\lambda$ such that the frequency distribution of the original image after sharpening is similar to that of a low resolution version of the original image. This selection allows the image sharpening system 10 to apply the appropriate amount of sharpening to the original image.

Figure 6:
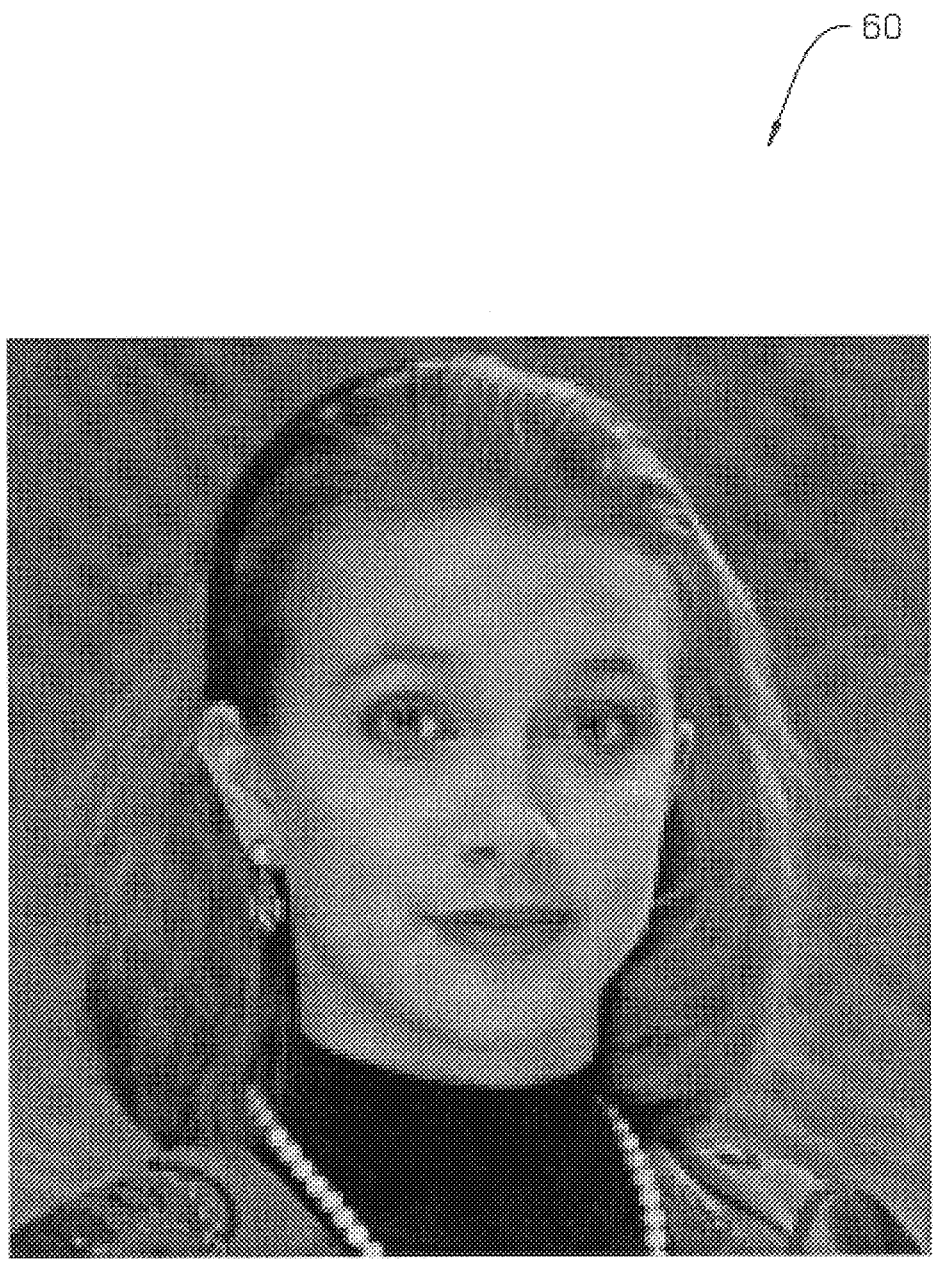
FIG. 6 shows a low resolution image of the original image generated by the low resolution image generator of FIG. 1.

To achieve this, the low resolution image generator 12 of the sharpening parameter selection system 11 generates a low resolution image of the given original image. When the original image is the image 50, the low resolution image is the image 60 (shown in FIG. 6). The low resolution image 60 is assumed to be of the proper sharpness for the represented scale. Because even the finest details visible in the low resolution image of an original image correspond to the coarse features in the original image, the assumption is reasonable even if the original image is quite blurry. Thus this low resolution image 60 serves as the sharpening reference for the original image 50. In other words, the low resolution image 60 of the original image 50 indicates how much sharpening should be applied to the original image 50.

Figure 7:
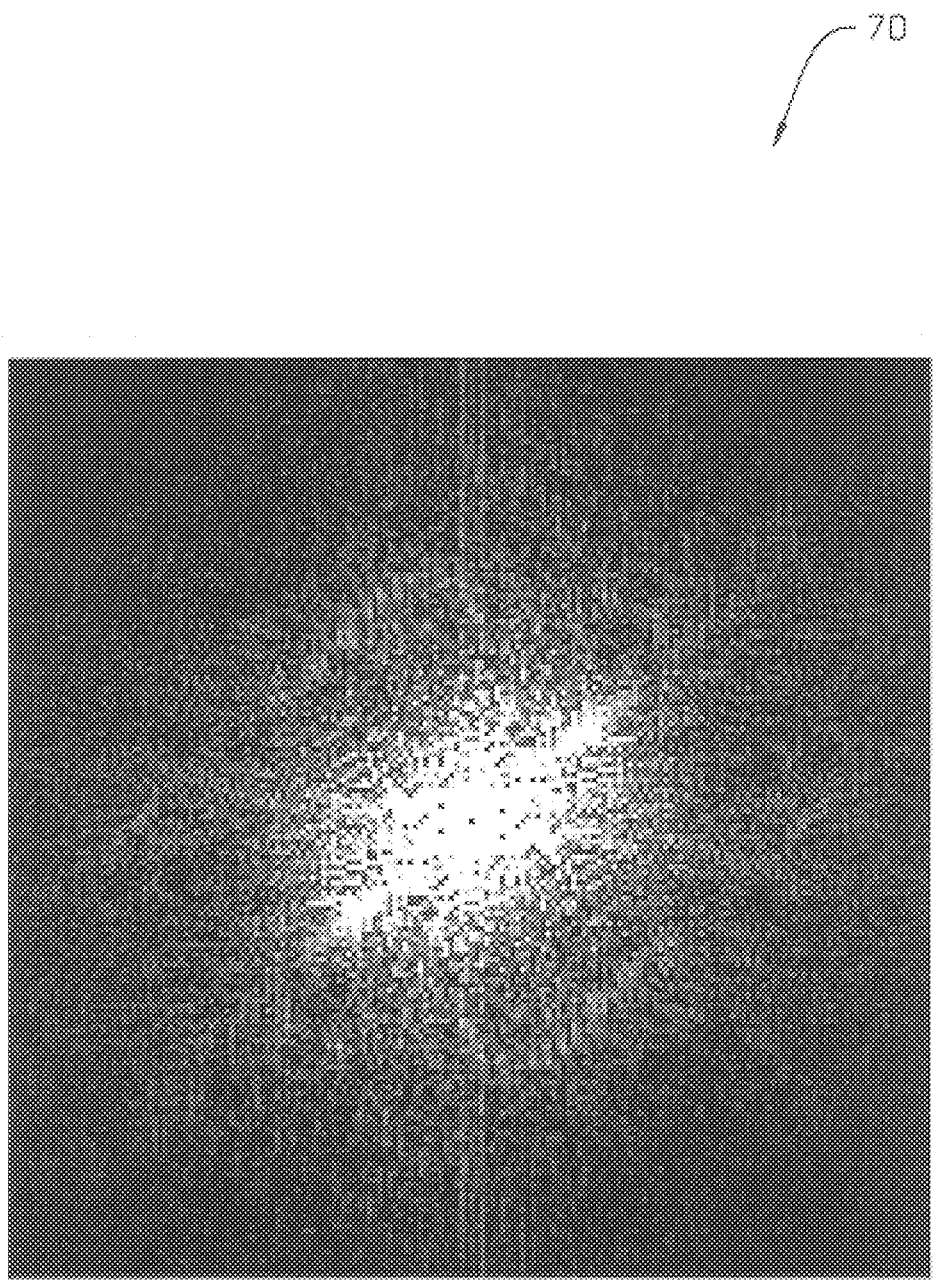
FIG. 7 shows the frequency distribution of the low resolution image of FIG. 6.

Then the low resolution image 60 is applied to the Fourier transform generator 13 to determine the frequency distribution of the low resolution image 60. The frequency distribution of the low resolution image 60 is then applied to the parameter selector 15. FIG. 7 shows the frequency distribution 70 of the low resolution image 60.

Figure 8A:
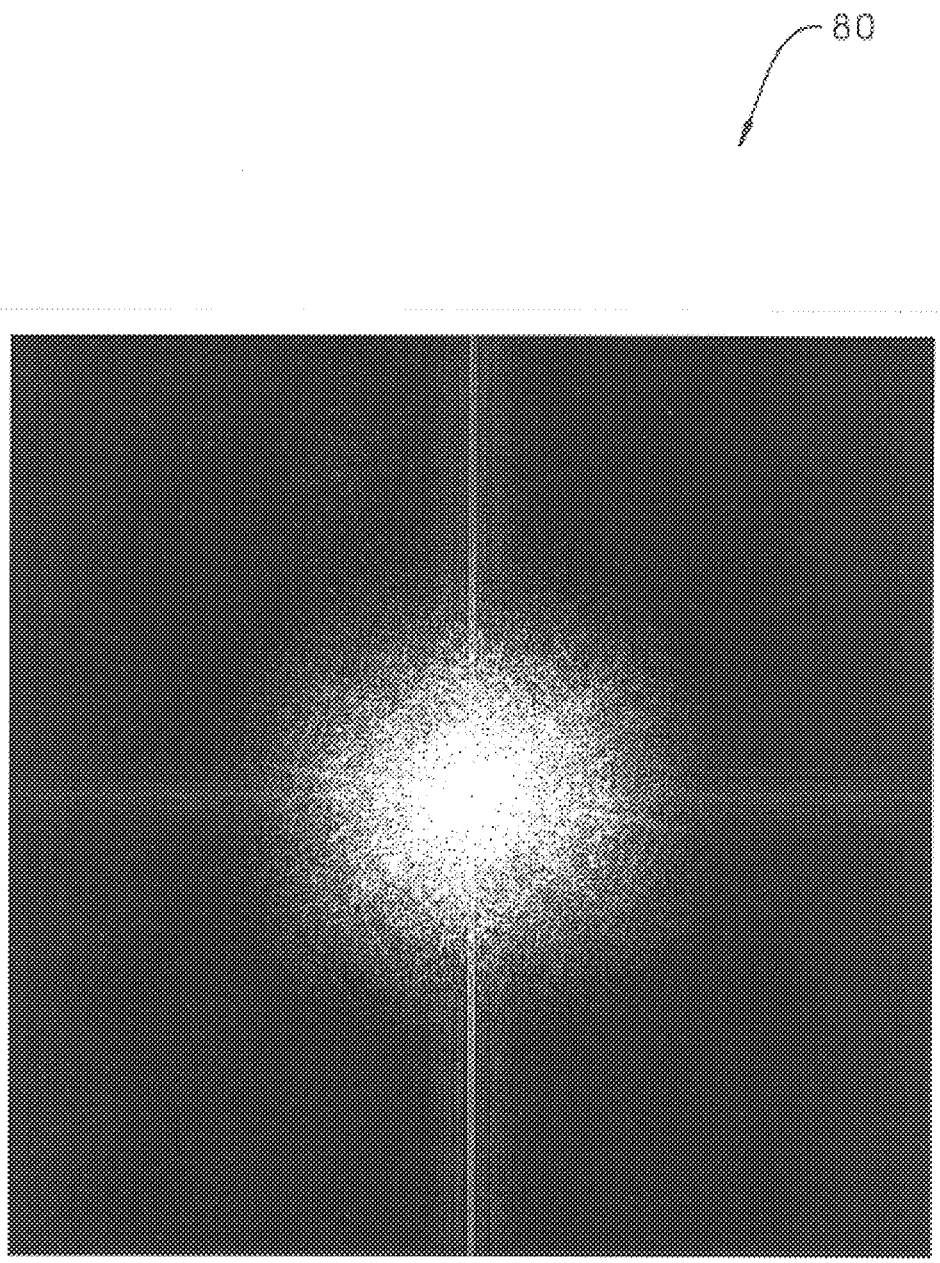
FIGS. 8A–8C show the frequency distribution of three sharpened images of the original image based on three predetermined sharpening parameters.
Figure 8B:
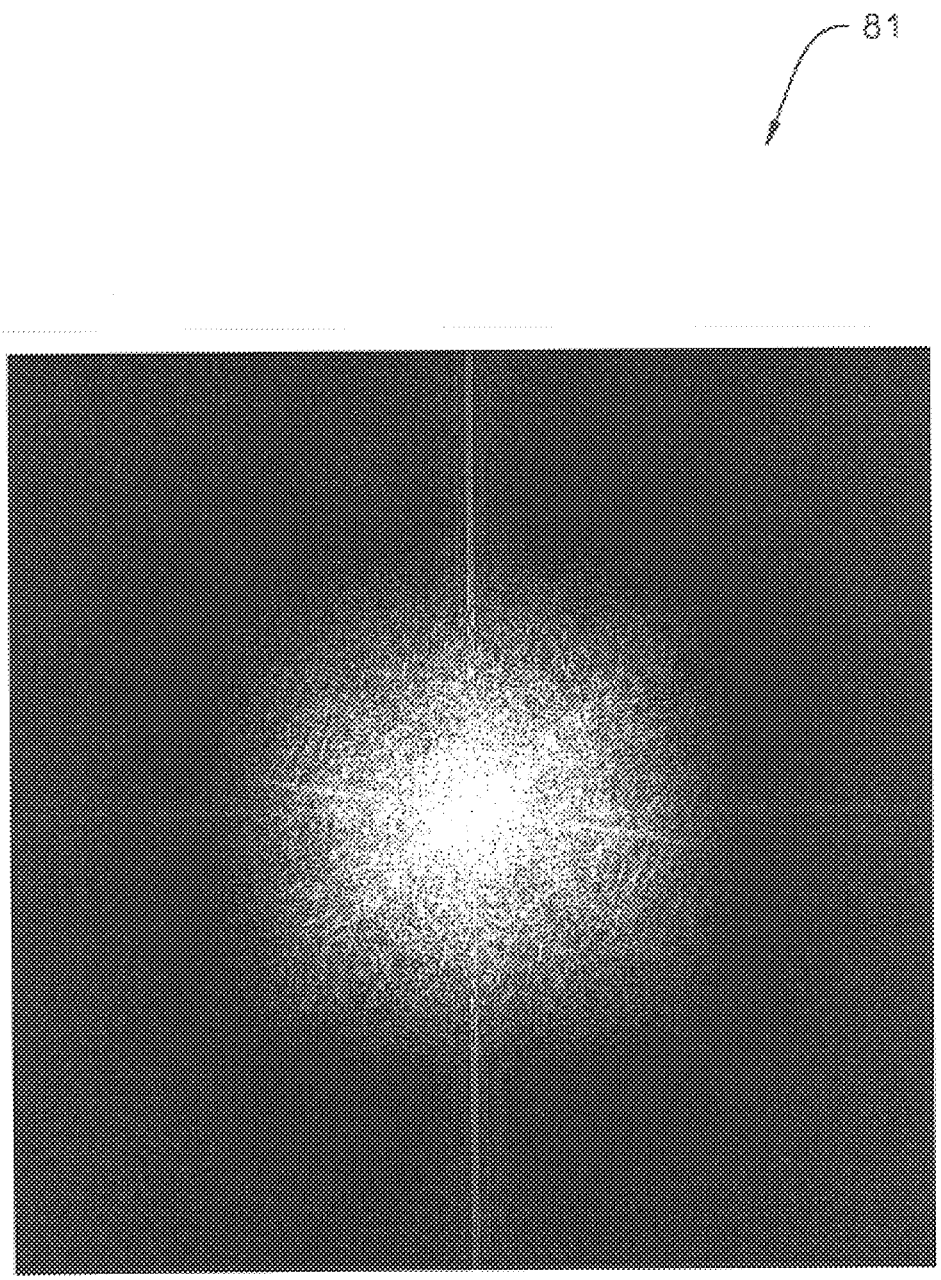
Figure 8C:
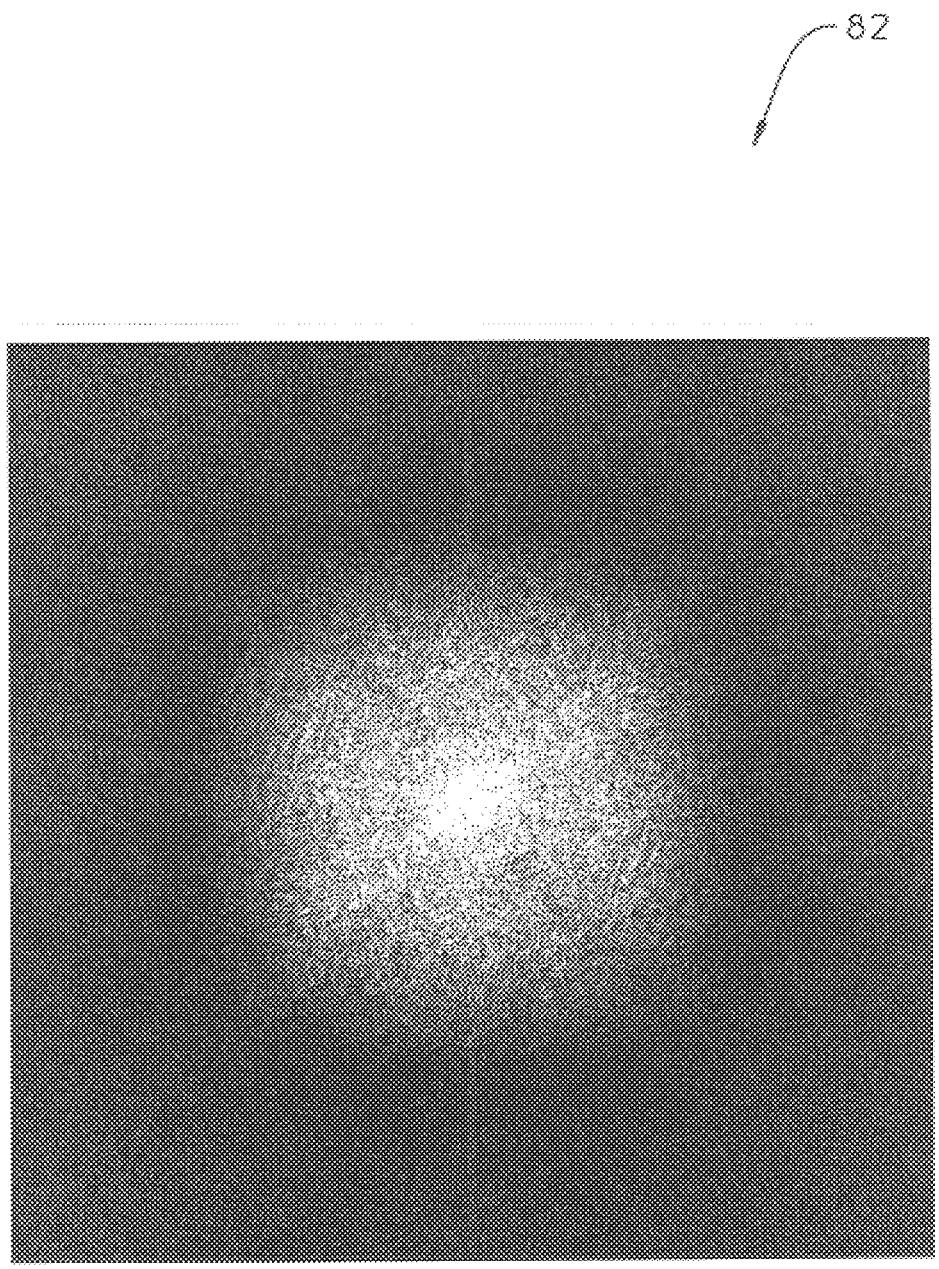
Figure 9:
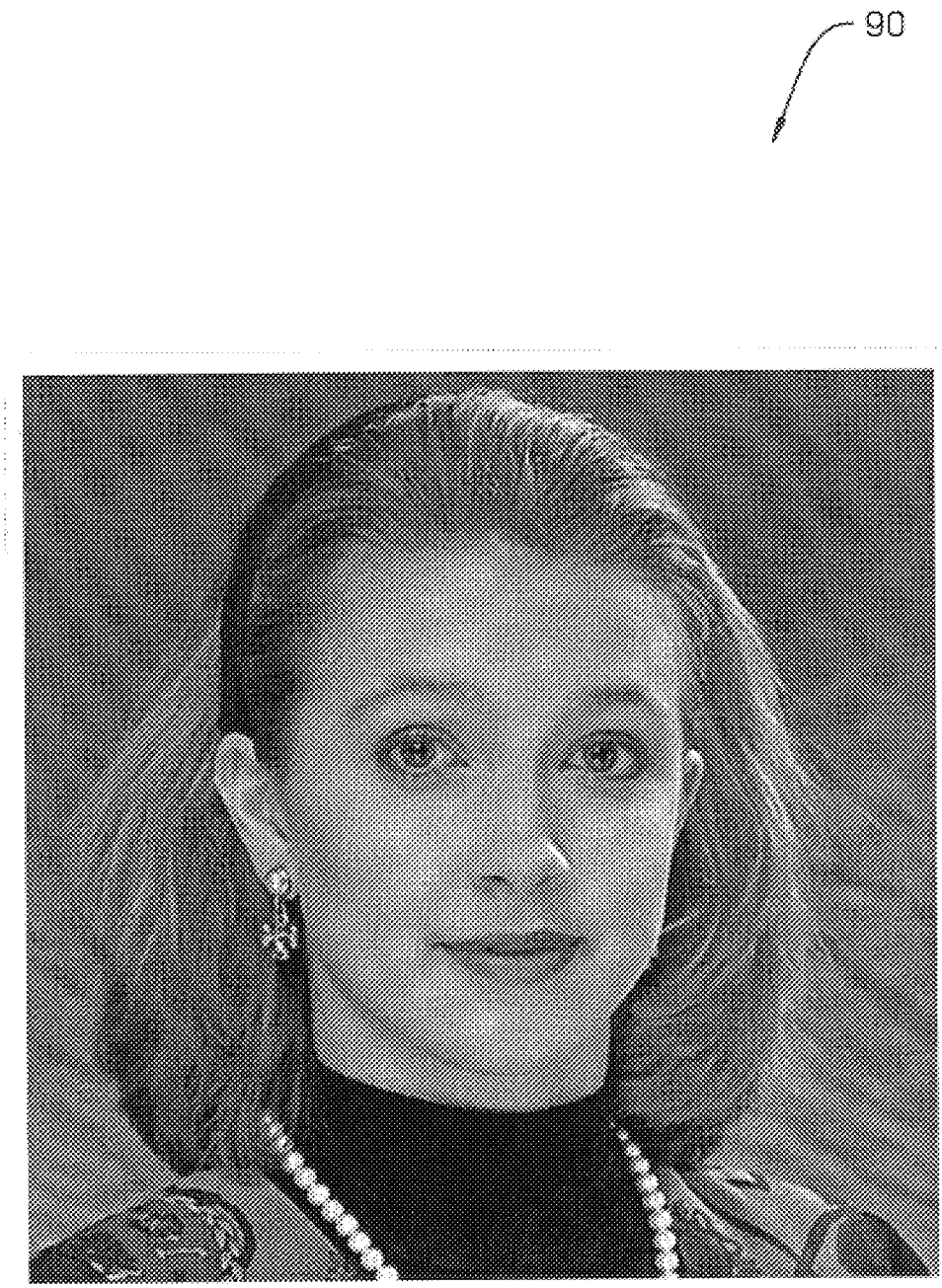
FIG. 9 shows the sharpened image generated by the image sharpening system of FIG. 1.

Meanwhile, the parameterized Fourier transform generator 14 generates a number of sharpened images of the original image 50 based on a number of predetermined sharpening parameters $\lambda_1$ through $\lambda_n$. The parameterized Fourier transform generator 14 also computes the frequency distribution of each of the sharpened images. FIGS. 8A through 8C show the frequency distribution of three sharpened images as an example. In practice, many more sharpened images are generated by many more predetermined sharpening parameters.

Figure 3:
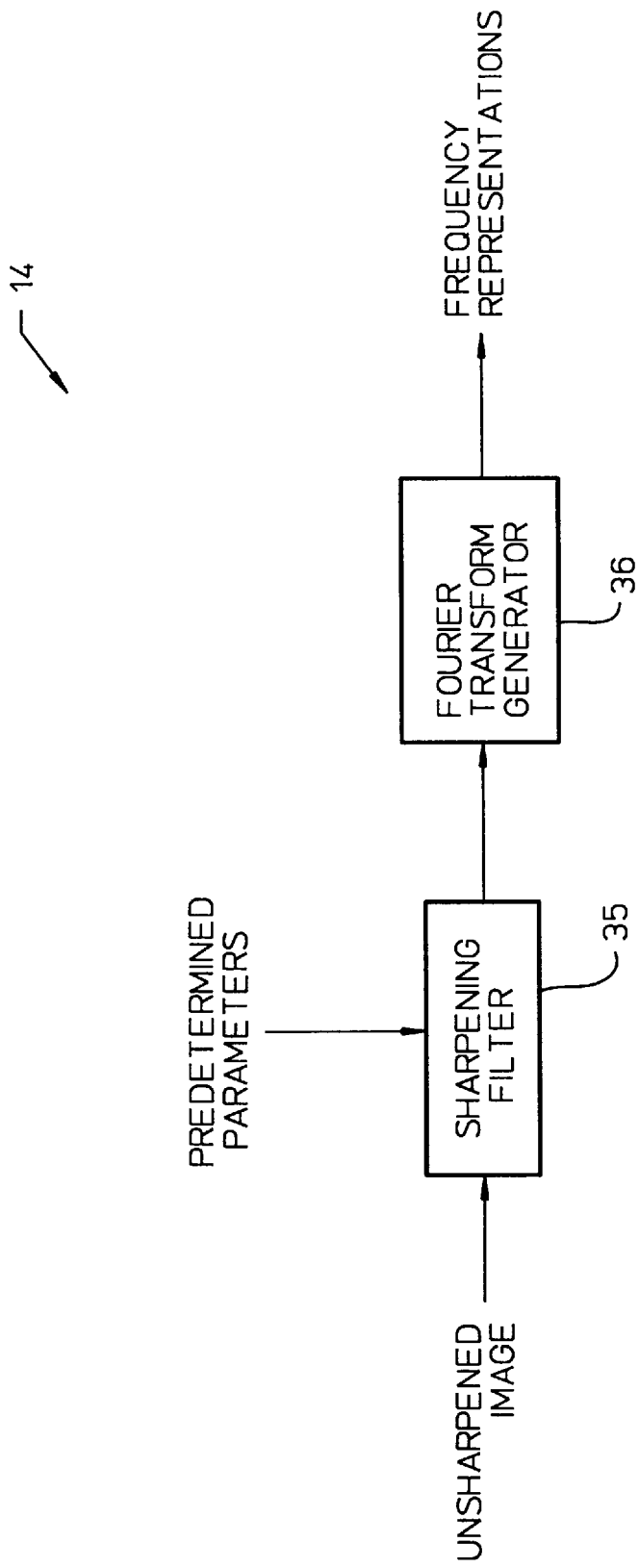
FIG. 3 shows the structure of the parameterized Fourier transform generator of FIG. 1.

FIG. 8A shows the frequency distribution 80 of a sharpened image sharpened in accordance with a first predetermined sharpening parameter value (e.g., zero). FIG. 8B shows the frequency distribution 81 of another sharpened image sharpened in accordance with a second predetermined sharpening parameter value (e.g., one). FIG. 8C shows the frequency distribution 82 of another sharpened image sharpened in accordance with a third predetermined sharpening parameter value (e.g., five). The structure of the parameterized Fourier transform generator 14 is shown in FIG. 3, which will be described in more detail below.

Referring back to FIG. 1, the parameter selector 15 then compares the frequency distribution 70 of the low resolution image 60 with the frequency distribution (e.g., each of the frequency distributions 80 through 82) of those sharpened images from the parameterized Fourier transform generator 14. This is to identify the frequency distribution of which sharpened image matches or is very similar to that of the low resolution image 60. Once the parameter selector 15 finds that particular sharpened image among the sharpened images, the predetermined sharpening parameter used to sharpen that sharpened image is selected as the sharpening parameter $\lambda$.

Figure 4:
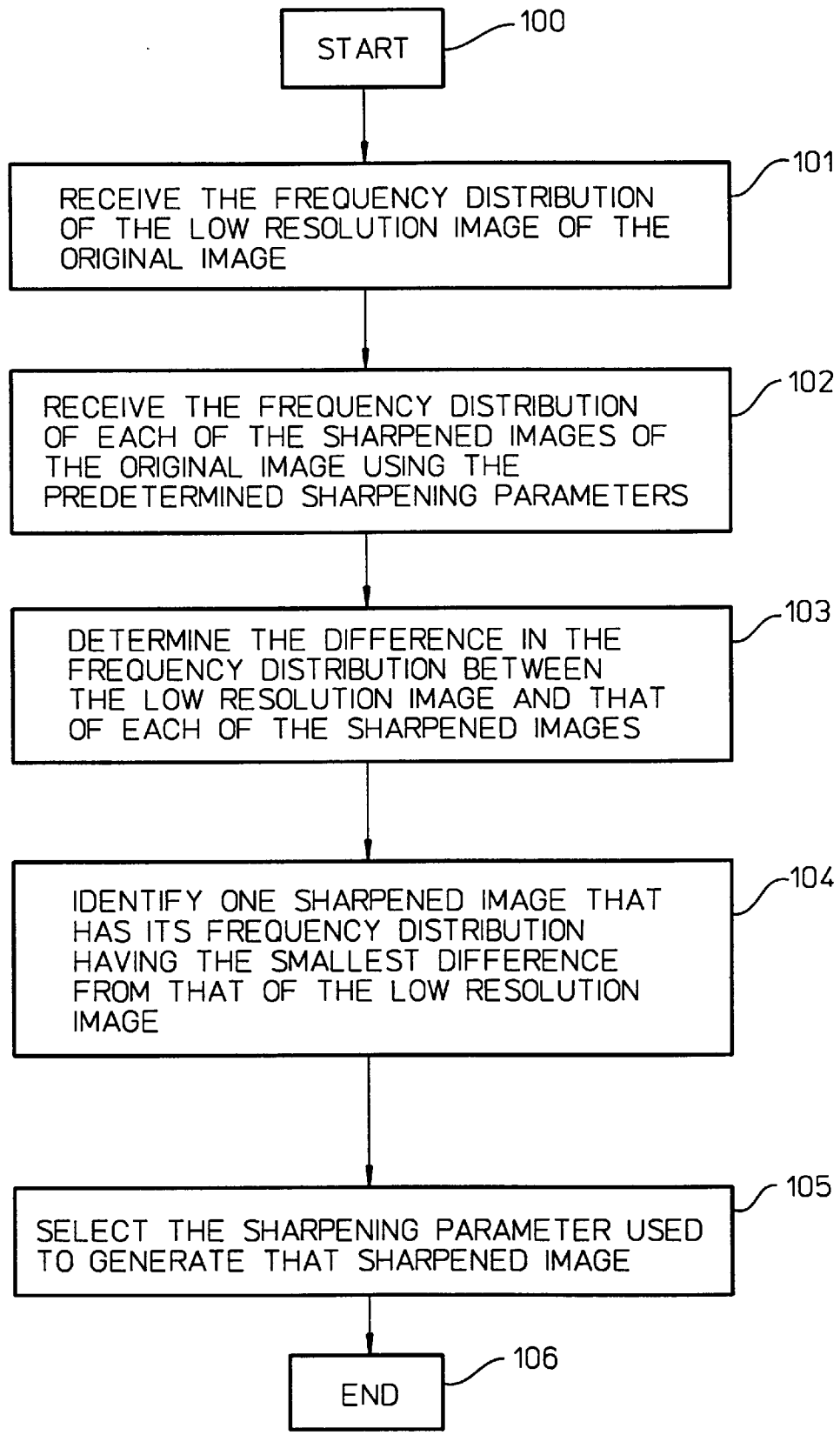
FIG. 4 is a flow chart diagram of the parameter selector of FIG. 1.

In order for the parameter selector 15 to compare the frequency distribution of two images, a metric should be specified for the comparison. In one embodiment, the metric specified to measure the difference in frequency distribution between two images is the variance of the frequency distribution. Alternatively, the parameter selector 15 may employ other known means to compare the frequency distribution of two images. For example, the parameter selector 15 may treat the frequency distributions as probability mass functions and use a statistical distance measure such as the Bhattacharrya distance to compare the frequency distribution of two images in order to determine the frequency distribution of which sharpened image from the parameterized Fourier transform generator 14 mostly resembles the frequency distribution 70 of the low resolution image 60. Other techniques could treat the Fourier transforms as digital images and use mean square error or some other distance metric to determine the difference between two frequency distributions. FIG. 4 shows in flow chart diagram form the process of the parameter selector 15, which will be described in more detail below.

Referring back to FIG. 1, the low resolution image generator 12 can be implemented by any known low resolution image generator 12. For example, the low resolution image generator 12 can be a lowpass filter followed by a subsampling operation. In one embodiment, the low resolution image generator 12 is a ¼ low resolution image generator. This means that the low resolution image 60 contains ¼ vertical and horizontal resolution of the original image 50. Alternatively, the low resolution image generator 12 can have different resolution scales.

In one embodiment, the Fourier transform generator 13 is a discrete Fourier transform generator (also known as fast Fourier transform generator). In other embodiments, the Fourier transform generator 13 can be implemented by other type of frequency analysis device.

FIG. 3 shows in block diagram form the structure of the parameterized Fourier transform generator 14 of FIG. 1. As can be seen from FIG. 3, the parameterized Fourier transform generator 14 includes a sharpening filter 35 and a Fourier transform generator 36 coupled to the sharpening filter 35. The sharpening filter 35 receives the predetermined sharpening parameters $\lambda_1$ through $\lambda_n$. The sharpening filter 35 sharpens the original image 50 in accordance with the predetermined sharpening parameters $\lambda_1$ through $\lambda_n$ to produce the sharpened images. The sharpened images are then applied to the Fourier transform generator 36 to compute their respective frequency distributions. The computed frequency distributions are then applied to the parameter selector 15 of FIG. 1 to identify the most suitable sharpening parameter from the predetermined sharpening parameters $\lambda_1$ through $\lambda_n$.

In one embodiment, the sharpening filter 35 is also a 3×3 unsharp masking filter. Alternatively, the sharpening filter 35 can be implemented by other type of filters. In one embodiment, the Fourier transform generator 36 is a discrete Fourier transform generator. Alternatively, the Fourier transform generator 36 can be implemented by other type of frequency analysis or computation devices.

Referring to FIG. 4, the process of the parameter selector 15 of FIG. 1 starts at the step 100. At the step 101, the parameter selector 15 receives the frequency distribution of the low resolution image generated by the Fourier transform generator 13. At the step 102, the parameter selector 15 receives the frequency distribution of each of the sharpened images using the predetermined sharpening parameters $\lambda_1-\lambda_n$. At the step 103, the parameter selector 15 determines the difference in the frequency distribution between the low resolution image 60 and each of the sharpened images. At the step 104, the parameter selector 15 identifies one of the sharpened images the frequency distribution of which has the smallest difference from that of the low resolution image 60 as the matching image. Alternatively, the parameter selector 15 may stop the comparison process when it discovers that the frequency distribution of one of the sharpened images is within a predetermined value $\alpha$ from that of the low resolution image 60. In that case, that sharpened image is regarded as the matching image.

At the step 105, the parameter selector 15 selects the predetermined sharpening parameter for the matching image as the sharpening parameter $\lambda$. The process then ends at the step 106.

Referring back to FIG. 1 and as described above, the metric employed by the parameter selector 15 to measure the difference in frequency distribution between two images can be the variance of the frequency distribution. In this case, if $F(\omega_1,\omega_2)$ represents the frequency distribution (i.e., frequency transform) of an image, the variance is defined as $$V = \frac{\int_{\pi}^{-\pi}\int_{\pi}^{-\pi}|F(\omega_1,\omega_2)|(\omega_1^2 + \omega_2^2)d\omega_1 d\omega_2}{\int_{\pi}^{-\pi}\int_{\pi}^{-\pi}|F(\omega_1,\omega_2)|d\omega_1 d\omega_2}$$

wherein $|F(\omega_1, \omega_2)|$ represents the absolute value of $F(\omega_1, \omega_2)$. In this case, the parameter selector 15 compares the variances of two images to determine if they match or are very similar.

Furthermore, given the above equation and other assumptions, the sharpening parameter $\lambda$ can be expressed as a function of the frequency transform of the original image. For example, when the sharpening filter 16 of FIG. 1 employs the filter window 30 of FIG. 2, $\lambda$ can be expressed as $$\lambda = \frac{N_L D_{1S} - D_L N_{1S}}{N_L(2D_{2S} - 4D_{1S}) - D_L(2N_{2S} - 4N_{1S})},$$

where $$N_L = \frac{256\pi^4}{MN} \sum_{k_1=0}^{M/8-1} \sum_{k_2=0}^{N/8-1} |F[k_1,k_2]| \left(\left(\frac{k_1}{M}\right)^2 + \left(\frac{k_2}{N}\right)^2\right)$$

$$D_L = \frac{4\pi^2}{MN} \sum_{k_1=0}^{M/8-1} \sum_{k_2=0}^{N/8-1} |F[k_1,k_2]|$$

$$N_{1S} = \frac{16\pi^4}{MN} \sum_{k_1=0}^{M/2-1} \sum_{k_2=0}^{N/2-1} |F[k_1,k_2]| \left(\left(\frac{k_1}{M}\right)^2 + \left(\frac{k_2}{N}\right)^2\right)$$

$$N_{2S} = \frac{16\pi^4}{MN} \sum_{k_1=0}^{M/2-1} \sum_{k_2=0}^{N/2-1} |F[k_1,k_2]| \left(\left(\frac{k_1}{M}\right)^2 + \left(\frac{k_2}{N}\right)^2\right)\left(\cos\left(\frac{2\pi k_1}{M}\right) + \cos\left(\frac{2\pi k_2}{N}\right)\right)$$

$$D_{1S} = \frac{4\pi^2}{MN} \sum_{k_1=0}^{M/2-1} \sum_{k_2=0}^{N/2-1} |F[k_1,k_2]|$$

$$D_{2S} = \frac{4\pi^2}{MN} \sum_{k_1=0}^{M/2-1} \sum_{k_2=0}^{N/2-1} |F[k_1,k_2]| \left(\cos\left(\frac{2\pi k_1}{M}\right) + \cos\left(\frac{2\pi k_2}{N}\right)\right)$$

In the above equation, it is assumed that the integrals are approximated by summations and the low resolution image is constructed at ¼ of the resolution of an M×N original image by an ideal lowpass filter. In addition, $F[k_1, k_2]$ represents the frequency distribution (or frequency transform) of the original image.

As can be seen from the above equation, although the above equation follows the process of the sharpening parameter selection system 11 of FIG. 1, the frequency distribution of the low resolution image is never explicitly computed. The sharpening parameter selection system 11 calculates the sharpening parameter $\lambda$ in one step without explicitly determining the frequency distribution of the low resolution image of the original image. In this case, the operation of each of the components 12–15 is integrated into the equation.

However, the above expressed equation to calculate the sharpening parameter $\lambda$ may sometimes be unstable in practice. The filter window 30 has a very small region of support, and the variance after sharpening approaches an asymptotic limit as the sharpening parameter $\lambda$ increases. Thus, the above equation needs to be modified slightly to ensure stability. One such modification is shown as follows $$\lambda = \begin{cases} \frac{N_L D_{1S} - D_L N_{1S}}{N_L(2D_{2S} - 4D_{1S}) - D_L(2N_{2S} - 4N_{1S})} & \text{if } \left|\frac{N_L}{D_L} - \frac{2N_{1S} - N_{2S}}{2D_{1S} - D_{2S}}\right| \geq \alpha \frac{2N_{1S} - N_{2S}}{2D_{1S} - D_{2S}} \\ \left|\frac{N_L D_{1S} - D_L N_{1S}}{2\alpha D_L(N_{1S} - N_{2S})}\right| & \text{if } \left|\frac{N_L}{D_L} - \frac{2N_{1S} - N_{2S}}{2D_{1S} - D_{2S}}\right| < \alpha \frac{2N_{1S} - N_{2S}}{2D_{1S} - D_{2S}}, \frac{N_L}{D_L} \geq \frac{N_{1S}}{D_{1S}} \\ -\left|\frac{N_L D_{1S} - D_L N_{1S}}{2\alpha D_L(N_{1S} - N_{2S})}\right| & \text{otherwise} \end{cases}$$

for some user chosen $\alpha \in (0, 1)$.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An image enhancing apparatus, comprising:
   (A) a filter that enhances the sharpness of an original image in accordance with a sharpening parameter;
   (B) a sharpening parameter selection system coupled to the filter, the sharpening parameter selection system determining the sharpening parameter for the filter such that the frequency distribution of a sharpened image of the original image by the filter is similar to that of a low resolution image of the original image.

2. The image enhancing apparatus of claim 1, wherein the sharpening parameter selection system further comprises
   (a) a low resolution image generator that generates the low resolution image of the original image;
   (b) a first Fourier transform generator coupled to the low resolution image generator to determine the frequency distribution of the low resolution image;
   (c) a parameterized Fourier transform generator that (1) generates a plurality of sharpened images of the original image based on a plurality of predetermined sharpening parameters and (2) determines the frequency distribution of each of the sharpened images;
   (d) a parameter selector coupled to the first Fourier transform generator and the parameterized Fourier transform generator to determine which one of the sharpened images has its frequency distribution similar to that of the low resolution image in order to select the sharpening parameter from the predetermined sharpening parameters.

3. The image enhancing apparatus of claim 2, wherein the parameterized Fourier transform generator further comprises
   (I) a sharpening filter that generates the plurality of sharpened images in accordance with the predetermined sharpening parameters;
   (II) a second Fourier transform generator that determines the frequency distribution of each of the sharpened images.

4. The image enhancing apparatus of claim 2, wherein the parameter selector determines which one of the sharpened images has its frequency distribution similar to that of the low resolution image by comparing the variance of the frequency distribution of the low resolution image with that of the sharpened images.

5. The image enhancing apparatus of claim 3, wherein each of the first and second Fourier transform generators is a discrete Fourier transform generator.

6. The image enhancing apparatus of claim 1, wherein each of the filter and the sharpening filter is an unsharp masking filter.

7. A method of sharpening an original image, comprising the steps of:
   (A) selecting a sharpening parameter such that the frequency distribution of a sharpened image of the original image using the selected sharpening parameter is similar to the frequency distribution of a low resolution image of the original image;
   (B) applying the selected sharpening parameter to a filter to sharpen the original image.

8. The method of claim 7, where the step (A) further comprises the steps of
   (I) generating a low resolution image of the original image;
   (II) performing a Fourier transformation operation to the low resolution image to determine the frequency distribution of the low resolution image;
   (III) generating a plurality of sharpened images of the original image based on a plurality of predetermined sharpening parameters;
   (IV) performing the Fourier transformation operation to each of the sharpened images to determine the frequency distribution of each of the sharpened images;
   (V) determining which one of the sharpened images has its frequency distribution similar to that of the low resolution image in order to select the sharpening parameter from the predetermined sharpening parameters.

9. The method of claim 8, wherein the step (V) further comprises the step of comparing the variance of the frequency distribution of the low resolution image with that of the sharpened images to determine which one of the sharpened images has its frequency distribution similar to that of the low resolution image.

10. The method of claim 8, wherein the step (V) further comprises the steps of
    (a) determining the variance of the frequency distribution of which one of the sharpened images has the smallest difference from that of the low resolution image;
    (b) selecting one of the predetermined sharpening parameter associated with that one of the sharpened images to be the selected sharpening parameter.

11. The method of claim 8, wherein the Fourier transformation operation is a discrete Fourier transformation operation.

12. An apparatus, comprising:
    (A) a storage medium;
    (B) a computer executable program stored on the storage medium that, when executed, sharpens an original image, wherein the program further comprises
       (I) a first set of instructions that select a sharpening parameter such that the frequency distribution of a sharpened image of the original image using the selected sharpening parameter is similar to the frequency distribution of a low resolution image of the original image;
       (II) a second set of instructions that apply the selected sharpening parameter to a filter to sharpen the original image.

13. The apparatus of claim 12, where the first set of instructions further comprises
    (a) a first subset of instructions that generate a low resolution image of the original image;
    (b) a second subset of instructions that perform a Fourier transformation operation to the low resolution image to determine the frequency distribution of the low resolution image;
    (c) a third subset of instructions that generate a plurality of sharpened images of the original image based on a plurality of predetermined sharpening parameters;
    (d) a fourth subset of instructions that perform the Fourier transformation operation to each of the sharpened images to determine the frequency distribution of each of the sharpened images;
    (e) a fifth subset of instructions that determine which one of the sharpened images has its frequency distribution similar to that of the low resolution image to select the sharpening parameter from the predetermined sharpening parameters.

14. The apparatus of claim 13, wherein the fifth subset of instructions determine which one of the sharpened images has its frequency distribution similar to that of the low resolution image by comparing the variance of the frequency distribution of the low resolution image with that of the frequency distribution of each of the sharpened images.

15. The apparatus of claim 13, wherein the fifth subset of instructions determine which one of the sharpened images has its frequency distribution similar to that of the low resolution image by (1) determining the variance of the frequency distribution of which one of the sharpened images has the smallest difference from that of the low resolution image, and (2) selecting one of the predetermined sharpening parameter associated with that one of the sharpened images to be the selected sharpening parameter.

16. The apparatus of claim 13, wherein the Fourier transformation operation is a discrete Fourier transformation operation.

* * * * *